US009759084B2

(12) United States Patent
Seo

(10) Patent No.: US 9,759,084 B2
(45) Date of Patent: Sep. 12, 2017

(54) POWER GENERATING DEVICE USING ELECTRIC FURNACE

(71) Applicant: Young Ho Seo, Gyeongsangnam-do (KR)

(72) Inventor: Young Ho Seo, Gyeongsangnam-do (KR)

(*) Notice: Subject to any disclaimer, the term of this patent is extended or adjusted under 35 U.S.C. 154(b) by 226 days.

(21) Appl. No.: 14/421,054

(22) PCT Filed: May 24, 2013

(86) PCT No.: PCT/KR2013/004563
§ 371 (c)(1),
(2) Date: Feb. 11, 2015

(87) PCT Pub. No.: WO2014/027741
PCT Pub. Date: Feb. 20, 2014

(65) Prior Publication Data
US 2015/0204206 A1    Jul. 23, 2015

(51) Int. Cl.
*F01D 15/10*     (2006.01)
*H02K 7/18*      (2006.01)
*F01K 3/18*      (2006.01)
*H02K 53/00*     (2006.01)

(52) U.S. Cl.
CPC .............. *F01D 15/10* (2013.01); *F01K 3/186* (2013.01); *H02K 7/1823* (2013.01);
(Continued)

(58) Field of Classification Search
CPC ...... F01D 15/10; H02K 7/1823; H02K 53/00; F01K 3/186; F05D 2220/72; Y10S 74/09
(Continued)

(56) References Cited

U.S. PATENT DOCUMENTS 3,943,718 A * 3/1976 Berry ................... F01K 3/186
                                                   60/676
4,377,737 A   3/1983 Berry
(Continued)

FOREIGN PATENT DOCUMENTS

JP    04-324001    11/1992
JP    2010-169356   8/2010
(Continued)

OTHER PUBLICATIONS

International Search report and Written Opinon issued in a corresponding PCT/KR2013/004563 on Aug. 28, 2013.

*Primary Examiner* — Hoang Nguyen
(74) *Attorney, Agent, or Firm* — Roberts Mlotkowski Safran Cole & Calderon P.C.

(57) ABSTRACT

The present invention relates to a power generating device using an electric furnace, and more particularly, to a power generating device using an electric furnace in which the electric furnace boils water using electricity to produce steam and a turbine is operated using the steam to produce electricity. The power generating device using an electric furnace according to the present invention includes an electric furnace, a steam pipe, a turbine, a power generator, a condenser, and a super-heater. The electric furnace heats water to produce steam. The steam pipe guides the steam ejected from the electric furnace. The turbine is disposed at an inlet of the steam pipe, and is operated with the steam. The power generator is operated by the turbine, and generates electricity. The condenser condenses the steam discharged after the turbine is operated. The super-heater superheats a condensate condensed in the condenser, and supplies the superheated condensate to the electric furnace. According to the present invention, it is possible to generate electricity by boiling water in an electric furnace to produce steam using midnight electric power. Accordingly, it is
(Continued)

possible to generate electricity without causing problems such as pollution and environment destruction occurring in thermal power generation or nuclear power generation.

5 Claims, 3 Drawing Sheets

(52) U.S. Cl.
CPC .......... *F05D 2220/72* (2013.01); *H02K 53/00* (2013.01); *Y10S 74/09* (2013.01)

(58) Field of Classification Search
USPC .................................................. 60/670–682
See application file for complete search history.

(56) References Cited

U.S. PATENT DOCUMENTS

| | | |
|---|---|---|
| 4,399,657 A | 8/1983 | Berry |
| 4,430,962 A | 2/1984 | Miszak |
| 6,951,105 B1* | 10/2005 | Smith ..................... F01K 3/186 60/646 |
| 7,220,365 B2* | 5/2007 | Qu .......................... C09K 5/14 165/104.15 |
| 7,886,538 B2 | 2/2011 | Schoettler et al. |
| 2008/0303348 A1* | 12/2008 | Witters ..................... H02J 3/46 307/72 |
| 2009/0165456 A1* | 7/2009 | Masada ................... F01K 9/003 60/531 |
| 2010/0005802 A1 | 1/2010 | Francis |
| 2011/0088396 A1* | 4/2011 | Katz ....................... F22B 1/006 60/641.8 |
| 2011/0265479 A1* | 11/2011 | Mihailoff ................ F22G 1/165 60/670 |
| 2012/0090778 A1 | 4/2012 | Cheng et al. |

FOREIGN PATENT DOCUMENTS

| | | |
|---|---|---|
| JP | 2012-017725 A | 1/2012 |
| KR | 10-2010-0057494 A | 5/2010 |
| WO | 00/42293 | 7/2000 |

* cited by examiner

POWER GENERATING DEVICE USING ELECTRIC FURNACE

TECHNICAL FIELD

The present invention relates to a power generating device using an electric furnace, and more particularly, to a power generating device using an electric furnace in which the electric furnace boils water using electricity to produce steam and a turbine is operated using the steam to produce electricity.

BACKGROUND ART

As four major energy sources of our country, there are petroleum, coal, nuclear power, and liquefied nature gas (LNG) in sequence. In the future, it is expected that the proportion of the petroleum and coal will be decreased, whereas the proportion of the nuclear power and LNG will be increased. Meanwhile, alternative energy is still insufficient as a realistic alternative due to the insufficiency of a technological level and market foundation furtherance, but a strong political will of the government and the conduct of supporting policy are urgently needed.

Energy experts argue "coal will be considerably depleted in fifty years," and "the development of alternative energy such as photovoltaic power generation, wind power generation, or landfill gas-to-electricity projects needs to be accelerated." However, in order to actively develop domestic alternative energy, it has been pointed out that problems such as a low technical level, the lack of professional manpower and an insufficient investment scale need should be solved.

In current thermal power generation, there are problems such as pollution and environment destruction, and in the nuclear power generation, there is a serious danger such as the Chernobyl nuclear accident and the Fukushima nuclear accident. However, the nuclear power generation has been used all over the world.

DISCLOSURE

Technical Problem

The present invention has been made in order to solve the aforementioned problems. An object of the present invention is to provide a method in which electricity is primarily generated using midnight electricity and electricity is generated reusing (giving feedback) the generated electricity (secondary) in an advanced-concept electric-power generating plant capable of compensating problems of the thermal power generation and nuclear power generation. In this case, when a heat radiation pipe is attached within the electric furnace, it is possible to greatly increase heat efficiency, and it is possible to sufficiently adjust a high-temperature and high-pressure device using steam.

Technical Solution

A power generating device using an electric furnace according to the present invention includes an electric furnace, a steam pipe, a turbine, a power generator, a condenser, and a super-heater. The electric furnace heats water to produce steam. The steam pipe guides the steam ejected from the electric furnace. The turbine is disposed at an inlet of the steam pipe, and is operated with the steam. The power generator is operated by the turbine, and generates electricity. The condenser condenses the steam discharged after the turbine is operated. The super-heater superheats a condensate condensed in the condenser, and supplies the superheated condensate to the electric furnace.

Further, in the power generating device using an electric furnace, the electric furnace preferably includes a housing, a plurality of heat-radiation-rod cases, a plurality of heat radiation rods, and a fixing member. The housing accommodates water. The heat-radiation-rod cases are attached to the housing so as to insert heat radiation rods from the outside. The heat radiation rods are respectively inserted into the heat-radiation-rod cases in order to heat the water accommodated in the housing by using electricity. The fixing member is attached to the housing so as to fix the heat-radiation-rod cases.

Furthermore, in the power generating device using an electric furnace, preferably, the heat-radiation-rod cases are attached by being inserted in a radial direction from the outside of the housing such that one ends thereof are fixed to the external side of the housing, and the plurality of heat-radiation-rod cases is attached in a circumferential direction of the housing at multiple stages. In this case, the fixing member is fixed at the center of the housing in a vertical direction, and fixes the other ends of the heat-radiation-rod cases.

Moreover, preferably, the power generating device further includes a plurality of heat-radiation-rod cases, and a plurality of heat radiation rods. The heat-radiation-rod cases are attached to the steam pipe so as to insert heat radiation rods from the outside. The heat radiation rods are respectively inserted into the heat-radiation-rod cases attached to the steam pipe in order to heat the steam flowing through the steam pipe using electricity.

In addition, preferably, the power generating device further includes a steam separator. In this case, the steam separator includes steam filter plates including a plurality of penetrating holes for discharging the steam at multiple stages at the upper portion of the housing such that the penetrating holes are deviated from one another in order to send only the steam generated within the housing to the steam pipe.

Further, in the power generating device using an electric furnace, preferably, the steam filter plate is provided with filter protrusions which vertically protrude so as to surround the penetrating holes.

Effect Of The Invention

According to the present invention, it is possible to generate electricity by boiling water in an electric furnace to produce steam using midnight electric power. Accordingly, it is possible to generate electricity without causing problems such as pollution and environment destruction occurring in thermal power generation or nuclear power generation.

DESCRIPTION OF MAIN REFERENCE NUMERALS OF DRAWINGS

| | |
|---|---|
| 10: Electric furnace | 11: Housing |
| 12: Heat radiation rod | 13: Fixing member |
| 14: Heat-radiation-rod cases | 14a: One end |
| 14b: The other end | 15: Steam separator |
| 16: Steam filter plate | 17: Penetrating hole |
| 18: Filter Protrusion | 20: Steam pipe |
| 25: Turbine | 30: Power generator |
| 35: condenser | |

[Best Mode]

Figure 1:
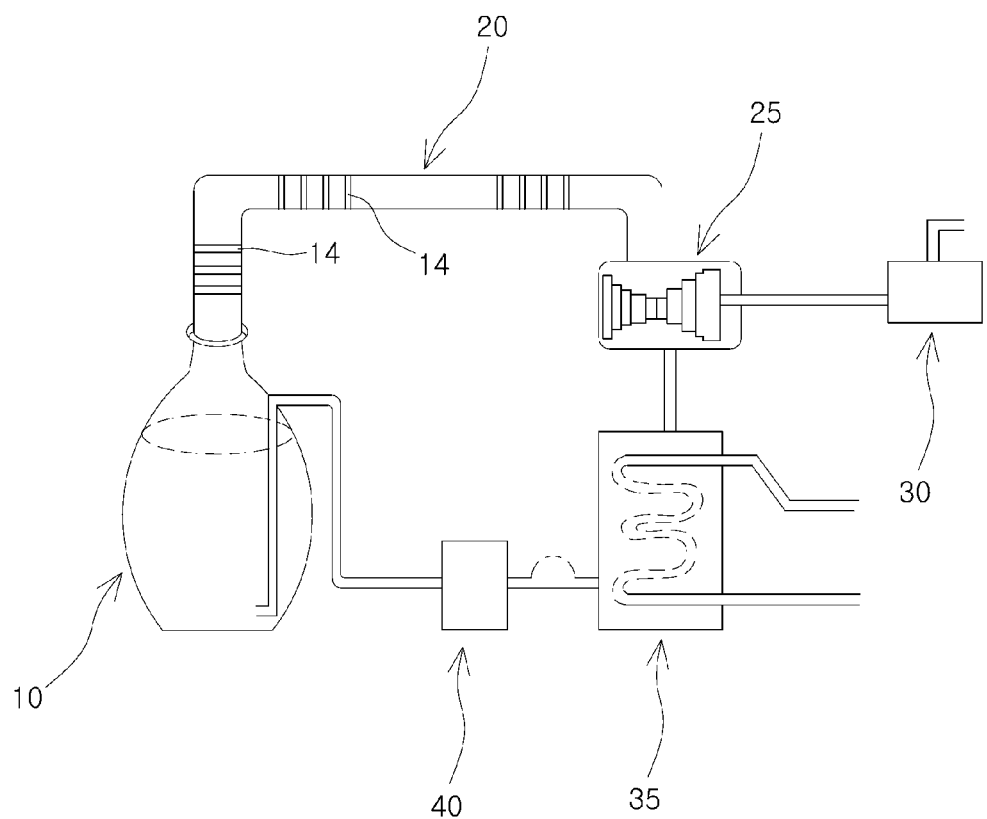
FIG. 1 is a conceptual diagram of an embodiment of a power generating device using an electric furnace according to the present invention.
Figure 2:
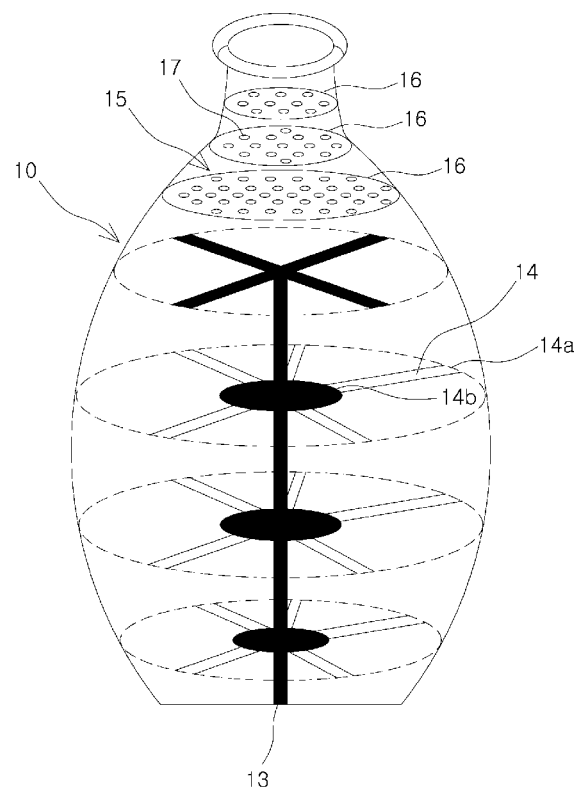
FIG. 2 is a conceptual diagram of the electric furnace of the embodiment shown in FIG. 1.
Figure 3:
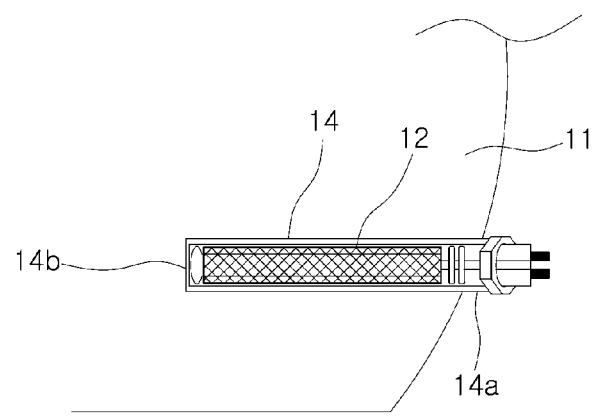
FIG. 3 is a conceptual diagram of s heat-radiation-rod case and a heat radiation rod attached to the electric furnace of the embodiment shown in FIG. 1.
Figure 4:
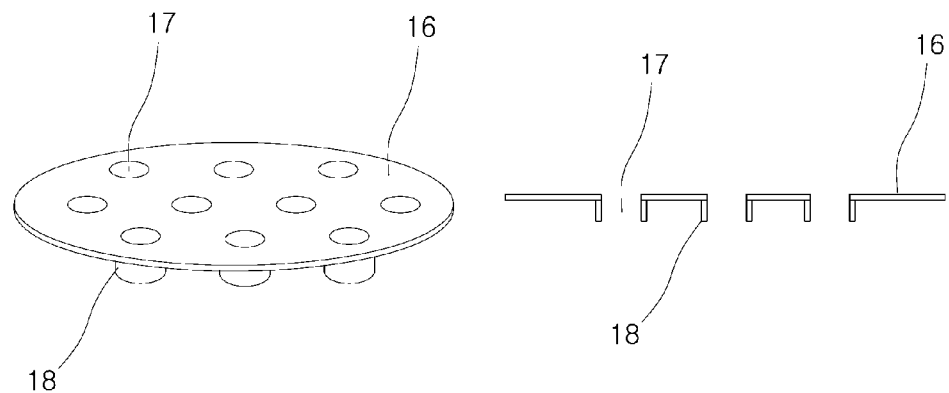
FIG. 4 is a conceptual diagram of a steam filter plate of the embodiment shown in FIG. 1.
Figure 5:
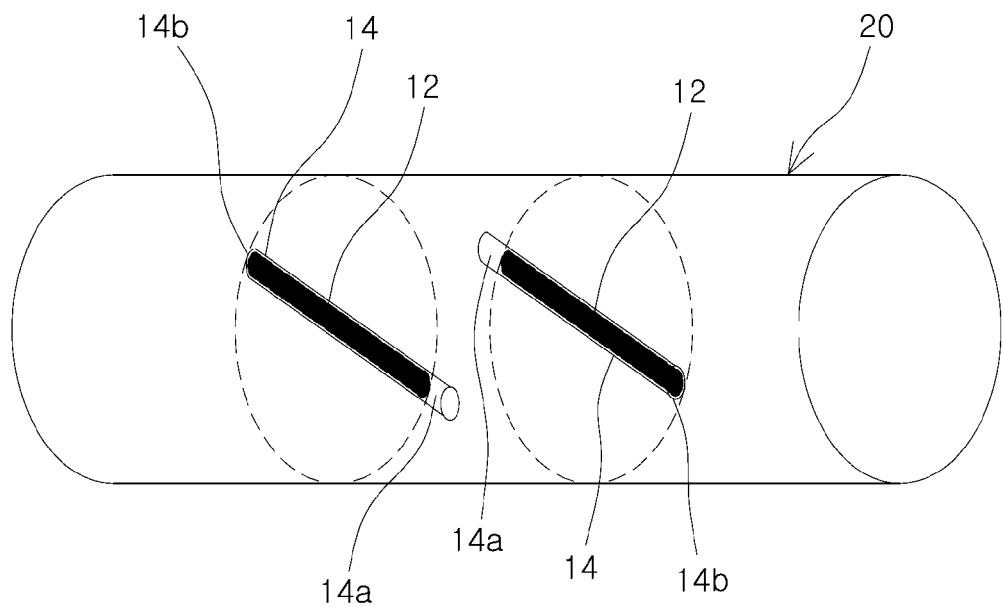
FIG. 5 is a conceptual diagram of the embodiment shown in FIG. 1.

An embodiment of a power generating device using an electric furnace according to the present invention will be described with reference to FIGS. 1 to 5.

The power generating device using an electric furnace according to the present invention includes an electric furnace 10, a steam separator 15, a steam pipe 20, a turbine 25, a power generator 30, a condenser 35, and a super-heater 40.

The electric furnace 10 heats water to produce high-temperature and high-pressure steam. To achieve this, the electric furnace 10 includes a housing 11, a plurality of heat-radiation-rod cases 14, a plurality of heat radiation rods 12, and a fixing member 13.

The housing 11 accommodates water. The heat radiation rods 12 are attached to the housing 11, and produce steam by heating the water accommodated in the housing 11 by using electricity. To achieve this, the heat-radiation-rod cases 14 are provided at the housing 11 such that the heat radiation rods 12 are attached to the housing 11.

The heat-radiation-rod case 14 serves to attach the heat radiation rod 12, and is attached by being inserted in a radial direction from the outside of the housing 11 such that one end 14a is fixed to the external side of the housing 11 to allow the heat radiation rod 12 to be attached from the outside. The plurality of heat-radiation-rod cases 14 is attached in a circumferential direction along the circumferential direction of the housing 11, and the plurality of heat-radiation-rod cases that is attached along the circumferential direction are formed as multiple layers. In this case, when water is heated to produce steam, the heat-radiation-rod cases 14 may be shaken due to the steam. In order to prevent this, the fixing member 13 serves to fix the heat-radiation-rod cases 12 within the housing 11. The fixing member 13 is provided in a vertical direction at the center of the housing 11, and fixes the other ends 12b of the heat-radiation-rod cases 14. That is, the fixing member 13 is fixed while being vertically erected state at the center of the housing 11, and the other ends 12b of the heat-radiation-rod cases 14 are fixed to the fixing member 13. The upper portion of the fixing member 13 is fixed to the housing 11 so as not to be shaken. The heat radiation rods 12 can be attached by being respectively inserted into the heat-radiation-rod cases 14 from the outside. When the heat radiation rod 12 is used for a long time, since the lifespan thereof expires, the heat radiation rod needs to be replaced with new one. In this case, it is possible to replace the heat radiation rod 12 by separating the heat radiation rod from the heat-radiation-rod case 14. When electricity is supplied to the heat radiation rods 12, the heat radiation rods 12 are heated, and the water within the housing 11 is heated to produce steam.

When the steam is produced within the housing 11, the steam separator 15 serves to filter only the steam and to send the filtered steam to the steam pipe 20. To achieve this, the steam separator 15 includes steam filter plates 16 at multiple stages.

A plurality of penetrating holes 17 is formed in the steam filter plate 16, and the steam can be ejected through the penetrating holes 17. Filter protrusions 18 that vertically protrude so as to surround the penetrating holes 17 are formed on the steam filter plate 16. The steam filter plates 16 are provided at the upper portion of the housing 11 at multiple stages, and in this case, the steam filter plates 16 are provided such that the penetrating holes 17 are deviated from one another on the steam filter plates 16. Thus, when the water boils in the housing 11 and is discharged through the penetrating holes 17, a part of moisture forms on the filter protrusions 18 by primarily colliding with the filter protrusions 18, and the rest is discharged through the penetrating holes 17. Meanwhile, since the steam filter plates 16 are formed at multiple stages and the penetrating holes 17 are deviated from one another in this case, moisture is removed while being discharged through the penetrating holes 17 at the respective stages, and only steam can be ejected to the steam pipe 20. Although not shown in the drawings, in this case, the steam filter plate 16 is preferably formed in a convex shape such as a substantially dome shape. In this case, the steam can be more easily gathered, and thus, it is possible to discharge the steam.

The steam pipe 20 serves to guide the steam generated in the housing 11 to the turbine 25. In this case, in order to increase the temperature and pressure of the steam in the steam pipe 20, it is necessary to heat the steam discharged to the steam pipe 20. To achieve this, the plurality of heat-radiation-rod cases 14 and the plurality of heat radiation rods 12 are provided at the steam pipe 20. In this case, in order to prevent shaking due to the flow of the steam, the heat-radiation-rod cases 14 are provided such that both ends thereof are fixed to the steam pipe 20. When the heat-radiation-rod cases 14 are fixed to the steam pipe 20, it is possible to attach the heat radiation rods 12 by being respectively inserted into the heat-radiation-rod cases 14 from the outside. The heat radiation rods 12 provided at the steam pipe 20 increase the pressure and temperature of the steam by heating the steam flowing through the steam pipe 20. Meanwhile, when the heat-radiation-rod cases 14 are provided at the steam pipe 20, the heat-radiation-rod cases are preferably provided such that inlets of the heat-radiation-rod cases 14 are deviated from one another.

The turbine 25 is provided at an outlet of the steam pipe 20, and is operated by the steam discharged from the steam pipe 20.

The power generator 30 is connected to the turbine 25 such that the power generating unit is operated by the turbine 25 to produce electricity.

The condenser 35 cools the steam discharged from the turbine 25 into water after the turbine 25 is operated.

The super-heater 40 heats the water cooled in the condenser 35, and supplies the heated water to the electric furnace 10. The turbine 25, the power generator 20, the condenser 35 and the super-heater 40 have the same configurations as those in the power generating device of the related art, and thus, the detailed description thereof will be omitted.

When the heat radiation rods 12 within the housing 11 of the electric furnace 10 are heated, the water accommodated in the housing 11 is heated to produce the steam. When the steam is produced, an ascending air current is generated, and thus, the heat radiation rods 12 may be shaken. However, the heat radiation rods 12 are provided in the heat-radiation-rod cases 14, one ends 14a of the heat-radiation-rod cases 14 are fixed to the housing 11, and the other ends 14b thereof are fixed to the fixing member 13. Thus, it is possible to prevent the heat-radiation-rod cases 14 from being shaken.

The steam generated in the housing 11 is discharged to the penetrating holes 17 of the steam filter plates 16, and passes through the penetrating holes 17 of the steam filter plates 16 provided at multiple stages. Thus, only the steam is discharged, and is introduced to the steam pipe 20. The steam introduced to the steam pipe 20 is heated one more time in the steam pipe 20 by the heat radiation rods 12 provided at the steam pipe 20, and thus, the temperature and pressure of the steam are increased. The steam whose pressure is increased by passing through the steam pipe 20 is discharged to the turbine 25 to operate the turbine 25. The turbine 25 operates the power generator 30, and thus, electricity is generated.

The invention claimed is:

1. A power generating device using an electric furnace, comprising:
    an electric furnace that heats water to produce steam;
    a steam pipe that guides the steam ejected from the electric furnace;
    a turbine that is disposed at an inlet of the steam pipe, and is operated with the steam;
    a power generator that is operated by the turbine, and generates electricity;
    a condenser that condenses the steam discharged after the turbine is operated; and
    a super-heater that superheats a condensate condensed in the condenser, and supplies the superheated condensate to the electric furnace,
    wherein the electric furnace includes
        a housing that accommodates water,
        a plurality of heat-radiation-rod cases that is attached to the housing so as to insert heat radiation rods from the outside,
        a plurality of heat radiation rods that are respectively inserted into the heat-radiation-rod cases in order to heat the water accommodated in the housing by using electricity, and
        a fixing member that is attached to the housing so as to fix the heat-radiation-rod cases.

2. The power generating device according to claim 1, wherein the heat-radiation-rod cases are attached by being inserted in a radial direction from the outside of the housing such that one ends thereof are fixed to the external side of the housing, and the plurality of heat-radiation-rod cases is attached in a circumferential direction of the housing at multiple stages, and
    the fixing member is fixed at the center of the housing in a vertical direction, and fixes the other ends of the heat-radiation-rod cases.

3. The power generating device according to claim 2, further comprising:
    a plurality of heat-radiation-rod cases that is attached to the steam pipe so as to insert heat radiation rods from the outside; and
    a plurality of heat radiation rods that is respectively inserted into the heat-radiation-rod cases attached to the steam pipe in order to heat the steam flowing through the steam pipe using electricity.

4. The power generating device according to claim 3, further comprising:
    a steam separator that includes steam filter plates including a plurality of penetrating holes for discharging the steam at multiple stages at the upper portion of the housing such that the penetrating holes are deviated from one another in order to send only the steam generated within the housing to the steam pipe.

5. The power generating device according to claim 4, wherein the steam filter plate is provided with filter protrusions which vertically protrude so as to surround the penetrating holes.

* * * * *